United States Patent [19]

Klegerman et al.

[11] Patent Number: 5,362,385
[45] Date of Patent: Nov. 8, 1994

[54] PORTABLE WATER FILTERING DEVICE

[75] Inventors: Neal A. Klegerman, 130 E. Randolph Dr., Chicago, Ill. 60601; Richard Fuksa, Park Ridge, Ill.

[73] Assignee: Neal A. Klegerman, Chicago, Ill.

[21] Appl. No.: 67,777

[22] Filed: May 26, 1993

[51] Int. Cl.$^5$ .................. B01D 27/02; B01D 27/08
[52] U.S. Cl. ......................... 210/136; 210/266; 210/282; 210/416.3
[58] Field of Search ............... 210/136, 264, 282, 287, 210/460, 461, 464, 469, 474, 482, 416.1, 416.3, 266

[56] References Cited

U.S. PATENT DOCUMENTS

| | | |
|---|---|---|
| 629,387 | 7/1899 | Nordtmeyer . |
| 1,556,426 | 10/1925 | Coop ............................ 210/416.3 |
| 2,436,077 | 2/1948 | Robertson ..................... 210/416.3 |
| 2,526,656 | 10/1950 | Goetz ........................... 210/416.3 |
| 2,649,205 | 8/1953 | Quinn ........................... 210/416.3 |
| 2,670,081 | 2/1954 | Quinn . |
| 4,277,333 | 7/1981 | Coppola . |
| 4,441,996 | 4/1984 | Hurst . |
| 4,443,336 | 4/1984 | Bennethum ................... 210/282 |
| 4,477,347 | 10/1984 | Sylva . |
| 4,505,310 | 3/1985 | Schneider ..................... 210/266 |
| 5,019,252 | 5/1991 | Kanei et al. ................... 210/136 |
| 5,078,874 | 1/1992 | Sullivan . |
| 5,106,500 | 4/1992 | Hembree et al. .............. 210/282 |
| 5,120,437 | 6/1992 | Williams . |
| 5,122,272 | 6/1992 | Iana et al. . |
| 5,130,020 | 7/1992 | Meckstroth ................... 210/288 |
| 5,156,737 | 10/1992 | Iana et al. . |

Primary Examiner—Robert A. Dawson
Assistant Examiner—W. L. Walker
Attorney, Agent, or Firm—Baker & McKenzie

[57] ABSTRACT

A personal, portable water filtering device is provided for use in filtering water taken from public drinking fountains, public wash basins or other public water sources. The preferred device includes a flexible attachment means for engaging the outlet of a water fountain, a tube connecting the attachment piece to a pump disposed between two check valves, a filter disposed between or within the pump and a tube connecting the filter to a mouthpiece. The user inserts the attachment means into the outlet of a water fountain or standing water supply which allows water to proceed up the first tube and into the hand-pump. The user then squeezes the hand-pump which forces water through the filter and the filtered water exits through the mouthpiece into the user's mouth. The device is lightweight and collapsible and will fit into the back pocket of athletic wear worn by joggers or other athletes.

5 Claims, 1 Drawing Sheet

PORTABLE WATER FILTERING DEVICE

FIELD OF THE INVENTION

This invention relates generally to portable water filtering devices for use by individuals drinking from public water fountains and other public water sources. The filtering device engages the water outlet and filters the water before it exits the mouthpiece to be consumed by the user. The device preferably includes an in-line pump and filter disposed between the water inlet and the mouthpiece or water outlet.

BACKGROUND OF THE INVENTION

The concept of a personal water filtration device is known. Specifically, U.S. Pat. No. 5,156,737 to Iana discloses such a device. However, the Iana device is in the form of a straw and therefore must be used with a glass or a cup of water (i.e., source of standing water). The tube of the Iana device is inserted into the standing water and the user sucks or draws water upward through the filter. Straw-like filtration devices cannot be used effectively with the most common source of public water, i.e., a water fountain because no standing water is provided, only a stream of running water. What is needed is a personal filtration device that can be used in connection with public water fountains as well as with wash basin faucets.

In today's climate, public water supplies have become increasingly contaminated with man-made chemicals and other contaminants such as bacteria and other microorganisms whose presence in the water supply is directly attributable to manmade causes. Bottled water or boiling of water may solve this problem temporarily, in the case of public water system failures. However, people often need access to water when they are out in the public. Specifically, runners and other people seeking exercise often require the intake of water while they are exercising in public parks. However, these people, who have a healthy attitude and a desire for exercise, are increasingly skeptical of the public water supply. Thus, there is a demand by runners and people seeking exercise in public places for a personal water filtration device that is portable, compact and easy to use. The present invention satisfies these criteria.

BRIEF DESCRIPTION OF THE INVENTION

The present invention makes a significant contribution to the water filtration art by providing an improved personal water filtration system that is small, lightweight and easy to carry. The water filtration system of the present invention may be folded up to fit into a pocket, purse or knapsack.

The improved portable water filtering device includes an attachment or a means for attaching or otherwise engaging the device to an outlet of a water source such as a public drinking fountain. The attachment is connected to a tube which is connected to a check valve. The check valve consists of a ball disposed in a conical section. The narrow end of the conical section is connected to the tube and the wider end of the conical section leads into a hand-pump. The ball disposed in the conical section permits upward flow of water from the water source through the tube and into the pump but effectively blocks the tube/conical section connection when water flows in the opposite direction back toward the water source.

The preferred embodiment of the pump is a squeeze-type hand-pump. A second check valve is disposed on the opposite side of the pump from the first check valve. The second check valve is preferably of the same configuration as the first check valve. The second check valve is then connected into a filtering section which includes filter material to effectively remove contaminants from the water. The filtering section is connected to a second tube which is thereafter connected to a mouthpiece.

In operation, the operator inserts the fountain attachment or the means for engaging an outlet of a water source into the outlet of a fountain or a faucet. The fountain attachment is preferably conically shaped so that it may mate with water outlets or faucets of varying diameters. The user then turns the water source on (if the fountain is not a continuously running fountain) and water proceeds up through the first tube past the first check valve into the pump. When the pump is full, the user squeezes the pump forcing the water past the second check valve and into the filter. The water is filtered before it proceeds up through the second tube and through the mouthpiece into the user's mouth.

The pump is most useful for low pressure water sources. However, for high pressure water sources, the water will simply flow through the pump, through the filter and through the mouthpiece. The user can increase the rate of water flow by using the pump regardless of the water pressure. In this manner, the pump provides water pressure control. Therefore, the pump needs to be used only for low pressure water sources and the pump also assists the user in controlling the rate of flow of filtered water through the mouthpiece.

One alternative embodiment of the present invention is an attachment means which is connected to a filter section which is then connected to a second tube which terminates at a mouthpiece. A check valve may be disposed upstream or downstream from the filter to prevent water drippings from the user's mouth from making contact with the water source.

In the preferred embodiment, both tubes are made of flexible hose so the entire apparatus may be coiled or rolled up and carried in the back pocket of a pair of running shorts or in the pocket of a sweatsuit. The tube may also be fabricated from more rigid material such as PVC (polyvinyl chloride). The squeeze-type hand-pump may be replaced by a battery-operated pump, a rotary pump or a reciprocating-type pump. The check valves are preferably in the form of the ball and conical section configuration as described above but other types of check valves will work and will also be apparent to those skilled in the art. Polyvinyl chloride is the preferred material of fabrication.

It is therefore an object of the present invention to provide an improved personal portable water filtering device for use with public drinking fountains, public wash basins as well as sources of standing water.

Another object of the present invention is to provide an improved portable water filtering device that engages water outlets and does not require a separate water container such as a glass or cup.

Yet another object of the present invention is to provide an improved water filtering device that will accommodate water outlets of varying diameters.

Still another related object of the present invention is to provide an improved portable water filtering device that is lightweight, compact and can be used by runners and other athletes in public places.

An additional object of the present invention is to provide a personal water filtering device that also makes it easier to drink from low pressure water fountains and other low pressure water sources.

Another object of the present invention is to provide a portable water filtering device that can be used without the user's mouth making contact with the public water source.

Still another object of the present invention is to provide a water filtering device that allows water flow in one direction thereby avoiding reverse flow of water from the user's mouth back onto the public water source for improved general sanitation of public water sources.

Other objects and advantages of the present invention will become apparent upon reading the following detailed description and appended claims, and upon reference to the accompanying drawings.

BRIEF DESCRIPTION OF THE DRAWINGS

This invention is illustrated more or less diagrammatically in the accompanying drawings, wherein.

DETAILED DESCRIPTION OF THE INVENTION

Figure 1:
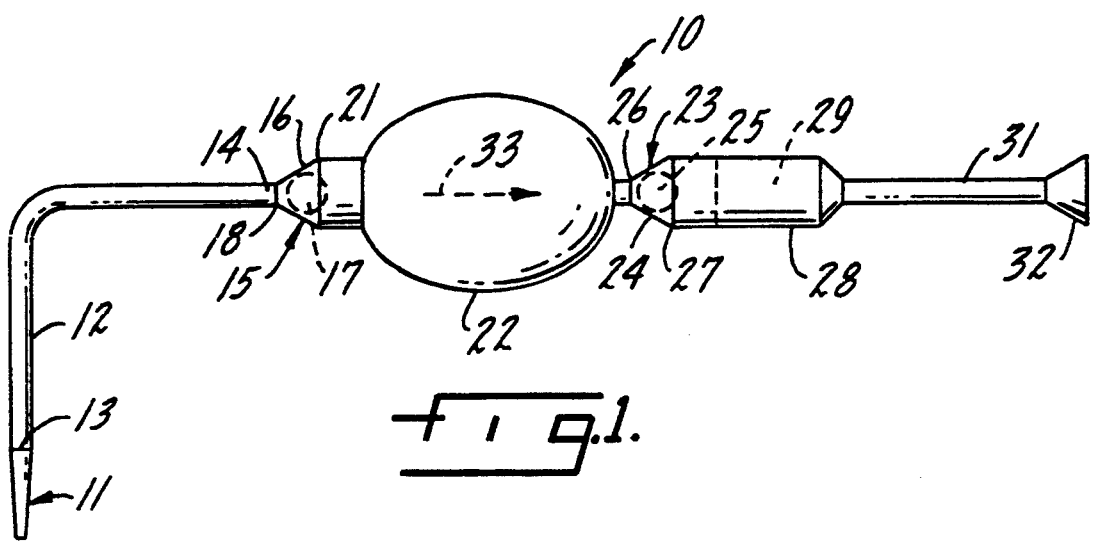
FIG. 1 is a side elevational view of a water filtering device made in accordance with the present invention.

Like reference numerals will be used to refer to like or similar parts from Figure to Figure in the following description of the drawings.

The dramatic improvement contributed by the present invention is best understood after considering the problems encountered by runners, joggers, athletes and other people who need to drink water in public places. Specifically, anyone who drinks out of a public water fountain may be taking the chance that the water is contaminated or that an ill person had just used the water fountain and contaminated the surfaces of the fountain. The present invention provides a small, compact and lightweight personal water filtering device that can be used with public water fountains. No additional cup or mug is required as with the straw-type filtering devices discussed above. The present invention may also be used with wash basin faucets.

Turning to FIG. 1, the personal water filtration device 10 includes the means for engaging an outlet of a water source or a fountain attachment 11. The fountain attachment 11 is connected to a first tube 12 at a first end 13 thereof. A second end 14 of the first tube 12 is connected to a first check valve or intake valve shown generally at 15. The first check valve 15 includes a conical section 16 which accommodates a ball or sphere 17. The narrow end 18 of the conical section is connected to the second end 14 of the tube 12. The wider end 21 of the conical section is connected to the pump 22. A retainer (not shown) prevents the ball 17 from exiting the check valve 15 and entering the hand pump 22.

In the embodiment illustrated in FIG. 1, the pump 22 is a squeezable ball made of polymeric material such as rubber. The pump 22 is connected to a second check valve or discharge valve 23. Like the first check valve or intake valve 15, the second valve 23 includes a conical section 24 which accommodates a sphere 25. The narrow end 26 of the conical section 24 is attached to the pump 22 and the wider end 27 of the conical section 24 is connected to the filter section, shown generally at 28. A retainer (not shown) prevents the ball 25 from exiting the check valve 23 and engaging or otherwise entering the filter section 28. The filter section 28 includes filter material 29. The filter section 28 is connected to a second tube 31 which is connected to a mouthpiece 32. An alternative embodiment with the scope of the present invention would include a filter section 28 disposed within a pump 22.

In operation, the user inserts the fountain attachment 11 into the outlet of a water fountain or faucet. The user then turns the water source on and water enters the attachment 11 and the first tube 12 before passing through the first check valve 15 and entering the pump 22. In order to speed the process, the user may then squeeze the pump 22 which forces the water in the direction of the arrow 33 and through the second check valve 23 into the filter section 28. The water passes through the filtering material 29 and into the second tube 31 before it exits the mouthpiece 32 and enters the user's mouth.

The hand-pump 22 is especially useful for low water pressure fountains. Specifically, the user may squeeze the hand-pump 22 before inserting the attachment 11 into the outlet of the fountain. Then the hand-pump 22 may be released thereby creating a low pressure region inside the tube 12 which will draw water up the tube 12 and through the first check valve 15 into the now expanding hand-pump 22. Once the hand-pump 22 has expanded, it is filled with water and the user may then squeeze the pump 22 to force water in the direction of the arrow 33 through the check valve 23 and into the filter section 28. It will be noted that, when the user squeezes the hand-pump 22 when it is full of water, the ball 17 of the first check valve 15 will engage and block the connection of the second end 14 of the tube 12 to the narrow end 18 of the conical section 16. Similarly, water will not flow in the reverse direction from the filter 28 to the hand-pump 22 because the ball 25 will engage the connection of the narrow end 26 of the conical section 24 to the pump 22 which will block the reverse flow of the water.

It will be noted that other means for precluding the reverse flow of water will be apparent to those skilled in the art and the invention is not limited to the use of the check valve 15, 23 embodiments shown in FIG. 1. Further, the filter section 28 may be disposed inside the pump 22 as opposed to between the pump 22 and the outlet or mouthpiece 32.

Figure 2:
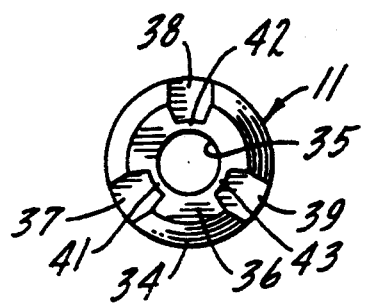
FIG. 2 is an enlarged side view of the fountain attachment or a means for engaging an outlet of a water source as first shown in FIG. 1.

Turning to FIG. 2, a bottom side view of the attachment 11 is illustrated. The outer wall 34 is tapered (see also FIG. 3) so it will engage water fountain outlets of varying diameters. The aperture 35 provides communication between the lower end 36 (see also FIG. 3) of the attachment 11 and the tube 12. The slots 37, 38 and 39 form three thin walls 41, 42 and 43 which are readily deformable and collapsible. The collapsibility of the walls 41, 42 and 43 enables the attachment 11 to easily compress for smaller water outlets and further assure proper sealing when the attachment 11 is inserted into a water outlet. An additional advantage to the flexibility of the attachment 11 as provided by the three thin walls 41, 42 and 43 is the availability of controlled water leakage in the event the water fountain provides water at an excessive discharge pressure.

Figure 3:
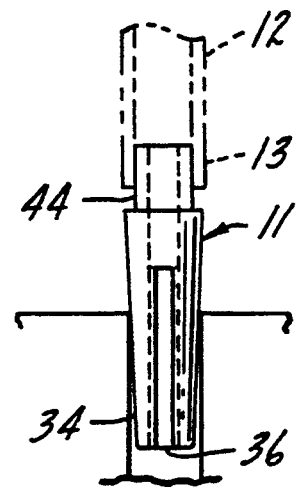
FIG. 3 is a bottom side view of the water fountain attachment shown in FIG. 2.

Turning to FIG. 3, the attachment 11 is connected to the downstream end 13 of the tube 12 via the male connector 44. The tapered configuration of the wall 34 along with the collapsibility of the attachment 11 as provided by the thin walls 41, 42 and 43 enables the attachment 11 to form a sealing engagement with water outlets of varying diameters.

Figure 4:
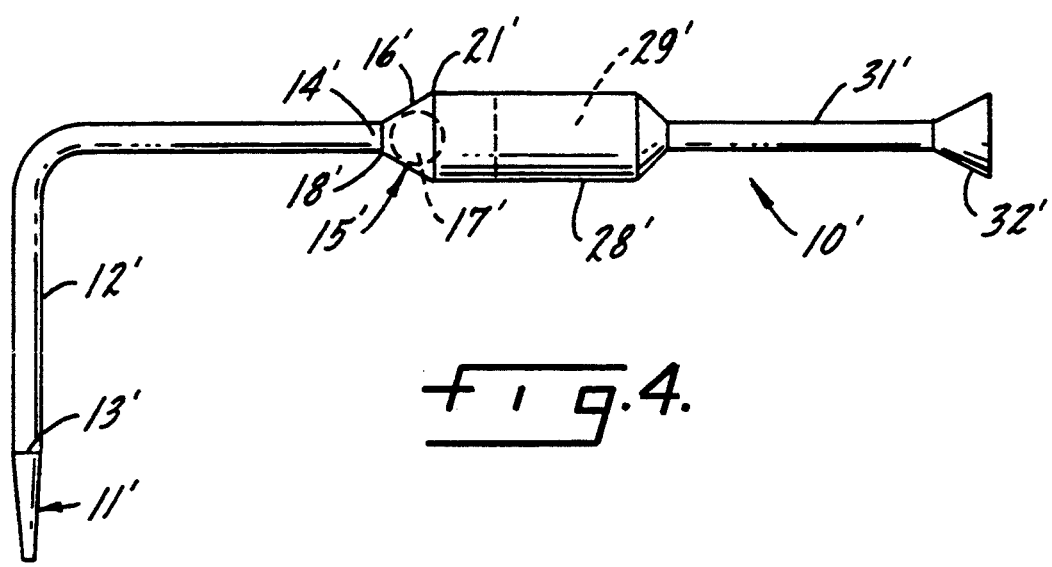
FIG. 4 is a side elevational view of an alternative embodiment made in accordance with the present invention.

Turning to FIG. 4, an alternative filtration device 10' is shown. The device 10' does not include a pump 22 or a second check 23 and is easier to operate. The check valve 15' is optional and its main function is to prevent water from traveling from the user's mouth down the tubes 31' and 12' to engage the water source. The check valve 15' may be disposed on either side of the filter section 28'.

Thus, the present invention provides a lightweight personal water filtering device 10 that may also be collapsible if flexible material is used for the hoses or tubes 12, 31 and may even be more flexible if the connection between the pump 22 and discharge valve 23 is also flexible. Granular activated charcoal (GAC) or GAC impregnated with silver may be employed as the filtering material 29. One possible grind size for GAC is 1230. Further, glass wool, synthetic fiber materials, chemical filtering materials and any other materials used to fabricate filters may be employed as filtering material 29. For example, filters used to filter blood may be used and other alternatives will be apparent to those skilled in the art. Due to the low manufacturing cost of the entire device 10, the entire filtering device 10 may be thrown away when the filtering material 29 becomes clogged or otherwise worn. If an expensive filtering material 29 is used, then a connection should be provided in the filtering section 28 so that the filtering material 29 can be changed and/or replaced.

The preferred material of construction is polyvinyl chloride or some other suitable plastic material. The hand-pump shown at 22 in FIG. 1 may also be replaced with a battery-operated pump, a rotary pump or a reciprocating pump and still fall within the spirit and scope of the present invention.

Although only one preferred embodiment of the present invention has been illustrated and described, it will at once be apparent to those skilled in the art that variations may be made within the spirit and scope of the invention. Accordingly, it is intended that the scope of the invention be limited solely by the scope of the hereafter appended claims and not by any specific wording in the foregoing description.

I claim:

1. A portable water filtering device for personal use, the device comprising:
    means for engaging an outlet of a water source,
    a first tube connecting the means for engaging an outlet to a first check valve,
    a pump means disposed in-line between the first check valve and a second check valve means,
    the first check valve permitting flow from the first tube toward the pump only and preventing flow in the reverse direction,
    a filter disposed opposite of the second check valve from the pump,
    the second check valve permitting flow from the pump toward the filter only and preventing flow in the reverse direction,
    a second tube connecting to mouthpiece.

2. The water filtering device of claim 1, wherein the means engaging an outlet of a water source is cone-shaped to matably engage outlets of varying diameters.

3. The water filtering device of claim 1, wherein the filter means is a contained bed of granular activated carbon.

4. A portable water filtering device for personal use in connection with public drinking fountains or other public water supplies, the device comprising:
    a cone-shaped connector matably engaging an outlet of a water source such as a public drinking fountain or wash basin faucet,
    a first tube connecting the cone shaped connector to a first check valve,
    a squeeze-type hand-pump disposed between the first check valve and a second check valve,
    a filter disposed opposite of the second check valve from the pump,
    a second tube connecting the filter to a mouthpiece.

5. A portable water filtering device comprising:
    means for engaging an outlet of a water source,
    a first tube connected to and disposed between the means for engaging an outlet and a dump means,
    the means for engaging the outlet fits inside of the outlet,
    check valve means disposed between the first tube and the pump means, the check valve means preventing fluid flow back toward the water source from the pump means,
    filter means disposed between the first tube and a second tube, the filter means is disposed Within the pump means,
    the second tube connecting the filter means to a mouthpiece.

* * * * *